(12) United States Patent
Tamura et al.

(10) Patent No.: US 8,066,314 B2
(45) Date of Patent: Nov. 29, 2011

(54) SLIDE DECK DEVICE FOR VEHICLE

(75) Inventors: Toshiro Tamura, Kanagawa (JP);
Kenichi Suzuki, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 178 days.

(21) Appl. No.: 12/664,102

(22) PCT Filed: Jun. 11, 2008

(86) PCT No.: PCT/JP2008/060657
§ 371 (c)(1),
(2), (4) Date: Dec. 11, 2009

(87) PCT Pub. No.: WO2008/153048
PCT Pub. Date: Dec. 18, 2008

(65) Prior Publication Data
US 2010/0171338 A1    Jul. 8, 2010

(30) Foreign Application Priority Data
Jun. 13, 2007    (JP) .................................. 2007-155804

(51) Int. Cl.
*B60P 3/34*    (2006.01)

(52) U.S. Cl. .................................................. 296/26.09

(58) Field of Classification Search ............... 296/26.09, 296/26.08, 37.1, 37.16; 248/424, 429, 430; 190/18 A; 312/330; 224/309, 310, 315, 224/324, 326
See application file for complete search history.

(56) References Cited

U.S. PATENT DOCUMENTS

| 4,950,123 A * | 8/1990 | Brockhaus ..................... 414/522 |
| 5,350,148 A * | 9/1994 | Yamamura ..................... 248/430 |
| 5,425,501 A * | 6/1995 | Wesorick ........................ 232/17 |
| 5,934,725 A * | 8/1999 | Bowers ....................... 296/26.09 |
| 5,938,092 A * | 8/1999 | Johnson ........................ 224/521 |
| 5,944,371 A * | 8/1999 | Steiner et al. .............. 296/26.09 |
| 6,059,345 A * | 5/2000 | Yokota ....................... 296/65.14 |

(Continued)

FOREIGN PATENT DOCUMENTS

JP    S63-160242 U    10/1988
(Continued)

OTHER PUBLICATIONS

International Search Report of PCT/JP2008/060657 (Aug. 15, 2008).

*Primary Examiner* — Kiran B. Patel
(74) *Attorney, Agent, or Firm* — Millen, White, Zelano & Branigan, P.C.

(57) ABSTRACT

A slide deck device for a vehicle is provided wherein a luggage placement plate can be operated to slide smoothly even if heavy luggage is placed on the front or rear end of the luggage placement plate and also wherein no adverse effect occurs in subsequent sliding operations. The slide deck device includes upper rollers 69 which are mounted to the upper rails 52, 53, 70, 71 and 87 to be positioned in front of rearmost lower rollers of the lower rollers 64, are positioned in the lower rails 25, are spaced away from ceiling surfaces 31 of the lower rails and the bottom surfaces 30 of the lower rails when in contact with the bottom surfaces, and come in contact with the ceiling surfaces to be rotatable thereon when some of the lower rollers move away from the bottom surfaces and the ceiling surfaces.

2 Claims, 14 Drawing Sheets

U.S. PATENT DOCUMENTS

| | | | |
|---|---|---|---|
| 6,065,792 A * | 5/2000 | Sciullo et al. | 296/26.09 |
| 6,120,075 A * | 9/2000 | Terry | 296/26.09 |
| 6,312,034 B1 * | 11/2001 | Coleman et al. | 296/26.1 |
| 6,328,364 B1 * | 12/2001 | Darbishire | 296/26.09 |
| 6,491,331 B1 * | 12/2002 | Fox | 296/26.09 |
| 6,520,474 B2 * | 2/2003 | Yoshida et al. | 248/430 |
| 6,705,656 B2 * | 3/2004 | Keller | 296/26.09 |
| 6,739,269 B1 * | 5/2004 | Benton | 108/44 |
| 6,860,536 B1 * | 3/2005 | Schimunek | 296/26.09 |
| 6,883,849 B2 * | 4/2005 | Hebert | 296/26.09 |
| 7,090,275 B2 * | 8/2006 | Pero | 296/37.6 |
| 7,128,357 B1 * | 10/2006 | Carroll | 296/61 |
| 7,237,817 B2 * | 7/2007 | Kobylski et al. | 296/26.09 |
| 7,543,872 B1 * | 6/2009 | Burns et al. | 296/26.09 |
| 7,543,873 B1 * | 6/2009 | Thornsberry | 296/26.09 |
| 2008/0061543 A1 * | 3/2008 | Gardner | 280/769 |
| 2008/0136206 A1 * | 6/2008 | McKelvey | 296/26.09 |
| 2010/0283279 A1 * | 11/2010 | Suzuki et al. | 296/26.09 |

FOREIGN PATENT DOCUMENTS

| | | |
|---|---|---|
| JP | H02-113533 U | 9/1990 |
| JP | H02-113536 U | 9/1990 |
| JP | 10-258685 A | 9/1998 |
| JP | 2002-87166 A | 3/2002 |
| JP | 2002-154367 A | 5/2002 |
| JP | 2004-330844 A | 11/2004 |

* cited by examiner

SLIDE DECK DEVICE FOR VEHICLE

FIELD OF THE INVENTION

The present invention relates to a slide deck device installed into a floor of a luggage compartment of a vehicle having a back door.

BACKGROUND OF THE INVENTION

A conventional slide deck device of a vehicle is disclosed in, e.g., Patent Document 1 (Japanese Unexamined Patent Publication No. 2002-87166).

The slide deck device disclosed in Patent Document 1 is provided with a pair of left and right guide rails 6 extending in the forward/rearward direction that are fixed to the bottom of a luggage compartment formed in the back of a vehicle body, and a luggage floor 4 in the shape of a flat plate which covers the upper surfaces of the left and right guide rails 6.

The guide rails 6 are each shaped into a channel which is open at the end thereof at the vehicle exterior side. In addition, the left and right guide rails 6 are each provided, on an outer-side surface of a rear end portion thereof, with a roller 8 which is rotatable about a rotational shaft extending in the vehicle width direction and immovable in the forward/rearward direction relative to the guide rail 6.

A pair of left and right brackets 4a project downwardly from a front end of the lower surface of the luggage floor 4, and a roller 7 which is rotatable about a rotational shaft extending in the vehicle width direction is mounted to each of the pair of left and right brackets 4a.

The left and right rollers 7 are positioned inside of the pair of guide rails 6 and come in contact with the bottoms of the left and right guide rails 6, respectively. In addition, since the left and right rollers 8 each support the bottom of the luggage floor 4, the luggage floor 4 is slidable in the forward/rearward direction along the left and right guide rails 6.

Accordingly, if the luggage floor 4 on which luggage is placed is drawn out rearwardly with the back door, which is provided on the back of the vehicle, being open, the luggage can be pulled out to the rear of the vehicle.

DISCLOSURE OF THE INVENTION

Problem to be Solved by the Invention

If the luggage floor 4 is drawn out rearwardly with heavy luggage placed on the rear end of the luggage floor 4, the front end of the luggage floor 4 that serves as a "point of action" is lifted upward due to "leverage" wherein the load of the luggage serves as a "power point" and the contact points between the pair of left and right rollers 8 and the bottom of the luggage floor 4 serve as "fulcrums". Upon the front end of the luggage floor 4 being lifted upward, the left and right rollers 7 thus lifted upward come into pressing contact with ceiling surfaces of the guide rails 6 with great force, respectively, thereby preventing the front end of the luggage floor 4 from being further lifted upward.

However, in this state, if the luggage floor 4 is slid toward the inside of the vehicle (toward the front of the vehicle), the left and right rollers 7 come into rolling contact with ceiling surfaces of the guide rails 6 with great force, and accordingly, there is a possibility of the left and right rollers 7 wearing and deforming greatly. If the left and right rollers 7 become worn and deformed greatly, the sliding action of the luggage floor 4 becomes unsmooth when the left and right rollers 7 are brought into contact again with the bottoms of the guide rails 6.

In addition, if heavy luggage is put on the front end of the luggage floor 4, the sliding operation of the luggage floor 4 cannot be performed smoothly because the bottom of the luggage floor 4 rises away from the left and right rollers 8 (is disengaged therefrom upwardly).

An object of the present invention is to provide a slide deck device for a vehicle wherein a luggage placement plate can be operated so as to slide smoothly even if heavy luggage is placed on the front or rear end of the luggage placement plate and also wherein no adverse effect occurs in the subsequent sliding operation.

Means for Solving the Problem

The slide deck device for vehicle according to the present invention is characterized in that the slide deck device includes a pair of left and right lower rails, each having a channel shape which is fixed to a floor of a luggage compartment of the vehicle, having a back door, and wherein the pair of left and right lower rails extend in a forward/rearward direction wherein upper surfaces thereof are open; a pair of left and right upper rails which are slidable relative to the pair of left and right lower rails and support left and right ends of a lower surface of a luggage placement plate, respectively; a plurality of lower rollers which are arranged in the forward/rearward direction, are mounted to the upper rails, are positioned in the lower rails, and contact bottom surfaces of the lower rails to be rotatable thereon; and upper rollers which are mounted to the upper rails to be positioned in front of rearmost lower rollers of the lower rollers, are positioned in the lower rails, are spaced away from ceiling surfaces of the lower rails and are spaced away from the bottom surfaces of the lower rails when all of the lower rollers come in contact with the bottom surfaces, and come in contact with the ceiling surfaces to be rotatable thereon when some of the lower rollers move away from the bottom surfaces and are away from the ceiling surfaces.

It is desirable for at least one of the lower rollers to be disposed in front of the upper rollers and for at least one of the lower rollers to be disposed behind the upper rollers.

Effects of the Invention

According to the present invention, if the luggage placement plate is drawn out toward the rear of the vehicle with heavy luggage being placed on the rear end of the luggage placement plate, the front lower rollers and the front of the luggage placement plate are lifted upward with the contact points between the rearmost lower rollers and the bottom surfaces of the lower rails serving as fulcrums. However, since the upper rollers which are forwardly positioned from the rearmost lower rollers come in contact with the ceiling surfaces of the lower rails, the luggage placement plate can be made to slide smoothly through the use of the rearmost lower and upper rollers.

In addition, when the front of the luggage placement plate rises in this manner, the front lower rollers do not become worn or deformed greatly even if the luggage placement plate is made to slide in such a state because the front lower rollers do not come into contact with the lower rails. Accordingly, thereafter, when all the lower rollers are again brought into contact with the bottom surfaces of the lower rails, the luggage placement plate can be made to slide smoothly.

If the slide deck device is constructed as disclosed in claim 2, the luggage placement plate can be operated to slide smoothly even if heavy luggage is placed on the front end of the luggage placement plate.

In addition, if heavy luggage is placed on the front end of the luggage placement plate, the lower rollers positioned behind the frontmost lower rollers are spaced upwardly away from the bottom surfaces of the lower rails. However, these lower rollers are not worn away or become deformed greatly even if the luggage placement plate is made to slide in such a state because these lower rollers do not come into contact with the ceiling surfaces of the lower rails. Accordingly, thereafter, when all the lower rollers are again brought into contact with the bottom surfaces of the lower rails, the luggage placement plate can be made to slide smoothly.

DESCRIPTION OF THE NUMERALS

Figure 1:
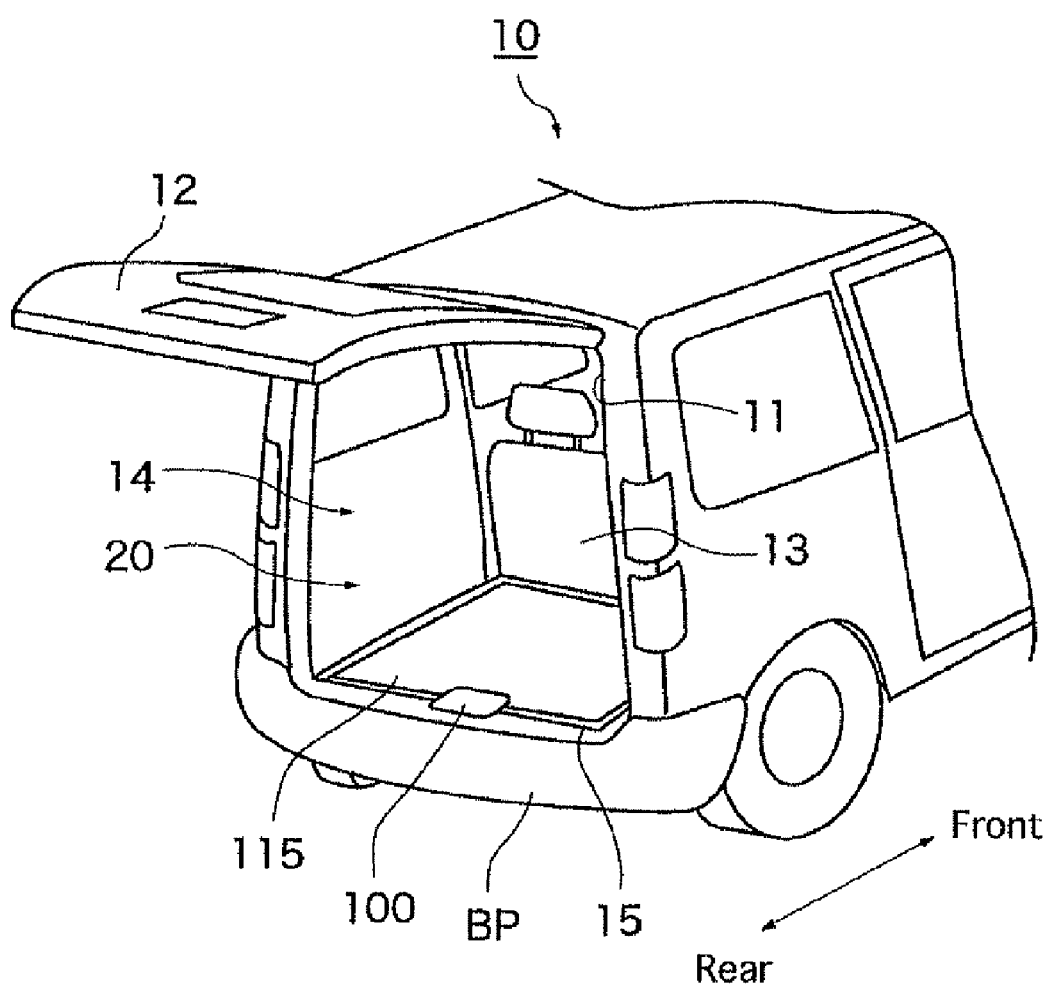
FIG. 1 is a perspective view of the rear of a vehicle to which an embodiment of the present invention has been applied.

10 Vehicle (automobile)
11 Rear opening
12 Back door
13 Second-row seat
14 Luggage compartment
15 Bottom plate
16 Front-end support portion
17 Fear-end support portion
18 Inclined mounting portion
19 Reinforcing member
20 Slide deck device
21 Front bracket
22 Rear bracket
25 Lower rail
26 Bottom plate portion
27 Side wall portion
28 Upper surface portion
29 Retaining portion
30 Bottom surface
31 Ceiling surface
32 Stopper member
33 34 35 Locking member
36 Lock hole
38 Rear-end support member
39 Contact plate
41 42 Mounting hole
43 Head
44 Stopper member
45 C-ring
47 Elongated hole
48 Notch
50 Slide unit
51 Roller support member
52 Inner-vehicle-side bracket (upper rail)
53 Outer-vehicle-side bracket (lower rail)
54 Upwardly-projecting portion
55 Horizontal portion
56 Side wall portion
57 Channel portion
59 60 Support hole
61 62 Rotational shaft
63 64 Lower roller
65 Central through-hole
66 Support hole
67 Rotational shaft
68 Rotational support portion
69 Upper roller
70 Inner-vehicle-side bearing member (upper rail)
71 Outer-vehicle-side bearing member (upper rail)
72 73 Bearing piece
74 Lock support member
75 Downward-extending piece
76 Inclined piece
77 Through-hole
78 Rotational shaft
79 Lock member
80 Window hole
81 Lock lug
83 Recessed engaging portion
84 Engaging ball
85 Support cylinder
86 Outer tube
87 Side portion support member (upper rail)
88 Mounting hole
89 Fixing bracket
90 Through-hole
91 Rear beam member
92 Upper flange
93 Front beam member
94 Metal connecting member
96 Tube bracket
97 Downward-extending piece
98 Support cylinder
99 Handle bracket
100 Operational handle
101 Rotational shaft
106 Screw hole
107 Support plate
108 Support hole
109 Rotational shaft 110 Support roller
111 Central through-hole
115 Luggage placement plate
116 Engaging hole
117 Front plate
118 Cap member
119 Recessed portion
120 Through-hole
B1 B2 B3 B4 B5 B6 Bolt
BP Bumper
R1 Rivet
C Cover member
N1 N2 N3 Nut
S Torsion coil spring
W1 Operational wire

EMBODIMENT

An embodiment of the present invention will be described below with reference to the accompanying drawings. Note that the forward/rearward direction and the leftward/rightward direction which will be mentioned in the following descriptions are determined with reference to the directions of the arrows shown in the drawings.

A rear opening 11 is formed in the rear of a vehicle 10, and the upper edge of a back door 12, which has the same front-elevational shape as that of the rear opening 11, is pivotally mounted at the upper edge of the rear opening 11 to be freely rotatable about an axis of rotation extending in the leftward/rightward direction. In addition, the vehicle 10 is provided immediately below the rear opening 11 with a bumper BP made of metal.

The vehicle 10 is provided in the interior thereof with two rows of front and rear seats (the numeral 13 shown in FIG. 1 designates the second-row seat), and is provided behind the second-row seat 13 with a luggage compartment 14. A slide deck device 20 for slidingly moving luggage placed thereon in the forward/rearward direction is installed on top of a metal bottom plate 15 which constitutes the bottom of the luggage compartment 14.

The structure of the slide deck device 20 will be discussed hereinafter.

The slide deck device 20 is provided with a pair of left and right lower rails 25, a slide unit 50 which is slidable in the forward/rearward direction relative to the lower rails 25, and a luggage placement plate 115 fixed to an upper surface of the slide unit 50, which are major elements of the slide deck device 20.

Figure 6:
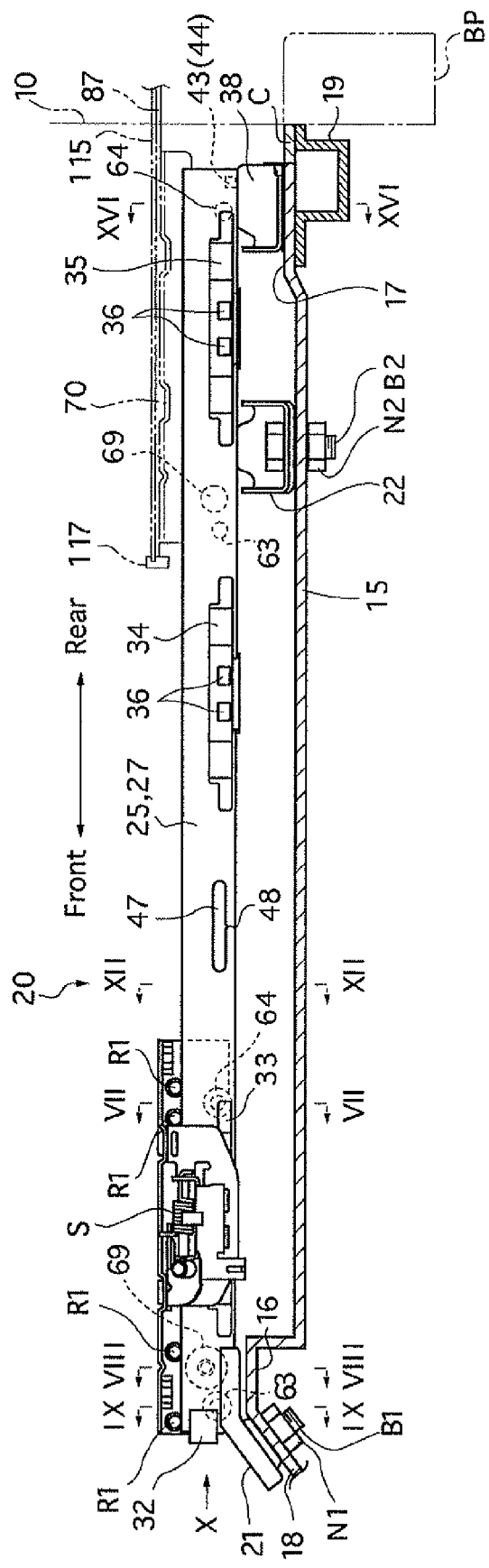
FIG. 6 is a side view of a right lower rail and peripheral elements thereof.

As shown in FIG. 6, a front-end support portion 16 and a rear-end support portion 17, which serve as a front end portion and a rear end portion of the bottom plate 15, respectively, project upward compared to a middle portion (flat portion) of the bottom plate 15, and a front surface of the front-end support portion 16 is formed as an inclined mounting portion 18 which is inclined downwardly in the forward direction. In addition, a reinforcing member 19 made as a metal channel member is fixed to the entire lower surface of the rear-end support portion 17 in the widthwise direction, and a cover member C made of synthetic resin is mounted on an upper surface of a rear half of the reinforcing member 19 over the full length thereof.

Through-holes (not shown) are bored through portions of the inclined mounting portion 18 of the front-end support portion 16 in the vicinity of the left and right ends thereof, respectively, and nuts N1 are fixed to the portions of the bottom surface (lower surface) of the front-end support portion 16 which correspond to the through-holes of the front-end support portion 16, respectively. In addition, front halves of metal front brackets 21 are mounted on the portions of the top surface of the front-end support portion 16 which correspond to the left and right through-holes on the top surface of the front-end support portion 16, respectively, and the pair of left and right front brackets 21 are fixed to the portions of the inclined mounting portion 18 in the vicinity of the left and right ends thereof, respectively, by screwing bolts B1, which are inserted through through-holes (not shown) formed through the front brackets 21 and the through-holes of the front-end support portion 16, into the nuts N1, respectively.

In addition, two through-holes (not shown) are bored through each of the left and right ends of a portion (closer to the front than the rear-end support portion 17) of the bottom plate 15 in the vicinity of the rear end thereof, and four nuts N2 are fixed to those portions of the back surface (lower surface) of the bottom plate 15 which correspond to the each through-hole of the bottom plate 15, respectively. Additionally, a pair of left and right rear brackets 22 are mounted to the bottom plate 15; namely, left and right side portions of each metal rear bracket 22 are mounted to the portions of the top surface of the bottom plate 15 which correspond to the left and right through-holes (pair of through-holes) of the bottom plate 15, and the pair of left and right rear brackets 22 are fixed to the bottom plate 15 by screwing four bolts B2, which are inserted through two pairs of through-holes (not shown) bored through the left and right sides of the two rear bracket 22 and each through-hole of the bottom plate 15, into the nuts N2, respectively.

Figure 8:
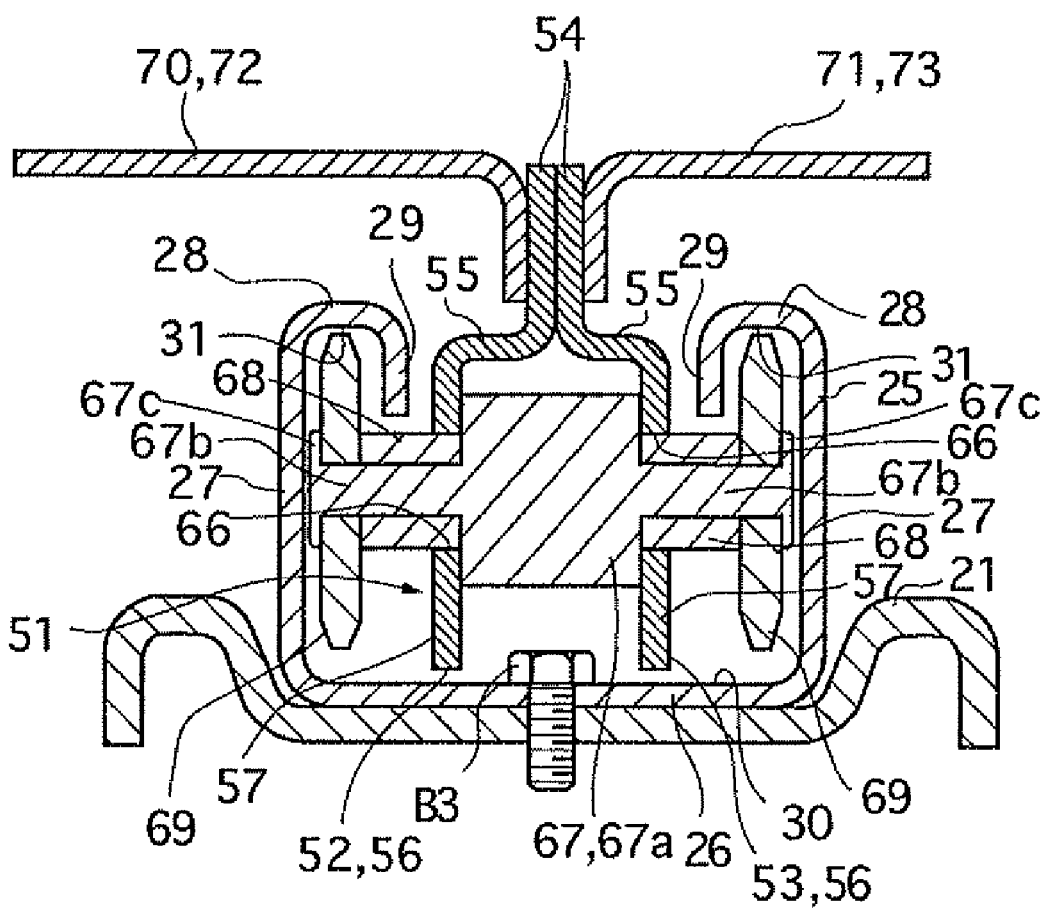
FIG. 8 is a cross sectional view taking along the arrow lines VIII-VIII in FIG. 6.

The left and right guide rails 25 are each formed as a metal channel member which extends in the forward/rearward direction and the top of which is open. The left and right lower rails 25 are fixed to the bottom plate 15 so as not to move relative to the bottom plate 15 by securing the front end of the bottom of each guide rail 25 to an upper surface of the rear half of the associated front bracket 21 by a screw and by securing a portion of the bottom of each guide rail 25 in the vicinity of the rear end thereof to an upper surface of the associated rear bracket 22 by a screw (as shown in FIG. 8, the front end of a bottom plate portion 26 of each lower rail 25 is fixed to the rear of the associated front bracket 21 by screwing a bolt B3 into a screw hole bored through the rear of the associated front bracket 21).

As shown in FIGS. 7 through 12, each lower rail 25 includes the bottom plate portion 26, a pair of left and right side wall portions 27 which extend upward from the left and right sides of the bottom plate portion 26, upper surface portions 28 which extend inwardly substantially in the horizontal direction from the upper ends of the left and right side wall portions 27, and retaining portions 29 which extend downward from the inner edges of the upper surface portion 28. The upper surface of the bottom plate portion 26 is formed as a flat bottom surface 30, and the lower surface of the upper surface portion 28 constitutes a flat ceiling surface 31. Stopper members 32 for closing the front ends of the left and right lower rails 25 are fixed to the front end surfaces of the left and right lower rails 25 (see FIG. 6).

Three locking members 33, 34 and 35 made of metal are welded to each of the side wall portions 27 of the left and right lower rails 25 which are positioned on the inner-vehicle side so that the three locking members 33, 34 and 35 are aligned in the forward/rearward direction. In addition, a pair of front and rear lock holes 36 are bored in each locking member 33, 34 and 35.

Figure 16:
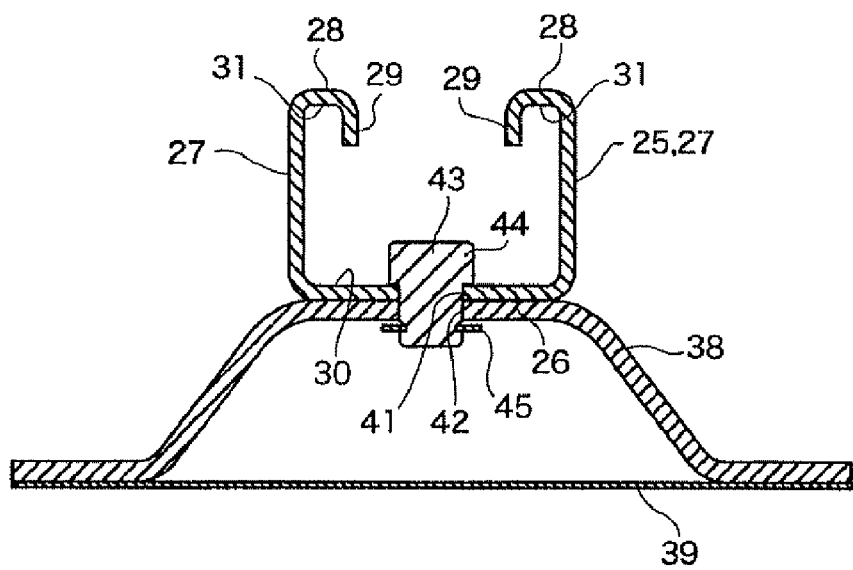
FIG. 16 is a cross sectional view taking along the arrow lines XVI-XVI in FIG. 6.

As shown in FIGS. 6, 16, etc., an upper surface of a rear-end support member 38 made of metal is welded to the rear end of the lower surface of the bottom plate portion 26 of each of the left and right lower rails 25, and a contact plate 39 in the form of a flat plate which is fixed to the bottom of the rear-end support member 38 is in contact with portions of the rear end support member 17 in the vicinity of the left and right ends thereof. In addition, as shown in FIG. 16, circular mounting holes 41 and 42 are bored through the portions of the upper part of the rear-end support member 38 and the rear end of the bottom plate portion 26 which are opposed to each other, respectively. A stopper member 44 made of metal which includes a head 43 that is greater in diameter than the mounting holes 41 and 42 is press-fitted into the mounting holes 41 and 42, and a C-ring 45 for preventing the stopper member 44 from coming out of the mounting holes 41 and 42 is also fitted onto an annular groove formed in the outer periphery of the lower end of the stopper member 44.

Additionally, the left and right lower rails 25 are each provided in the vicinity of the centers of the left and right side wall portions 27 (between the locking members 33 and 34) with elongated holes 47, respectively, which extend in the forward and rearward directions, and a V-shaped notch 48 is formed at the center of the lower edge of each elongated hole 47.

Next, the structure of the slide unit 50 that is slidable relative to the left and right lower rails 25 will be illustrated hereinafter.

Figure 7:
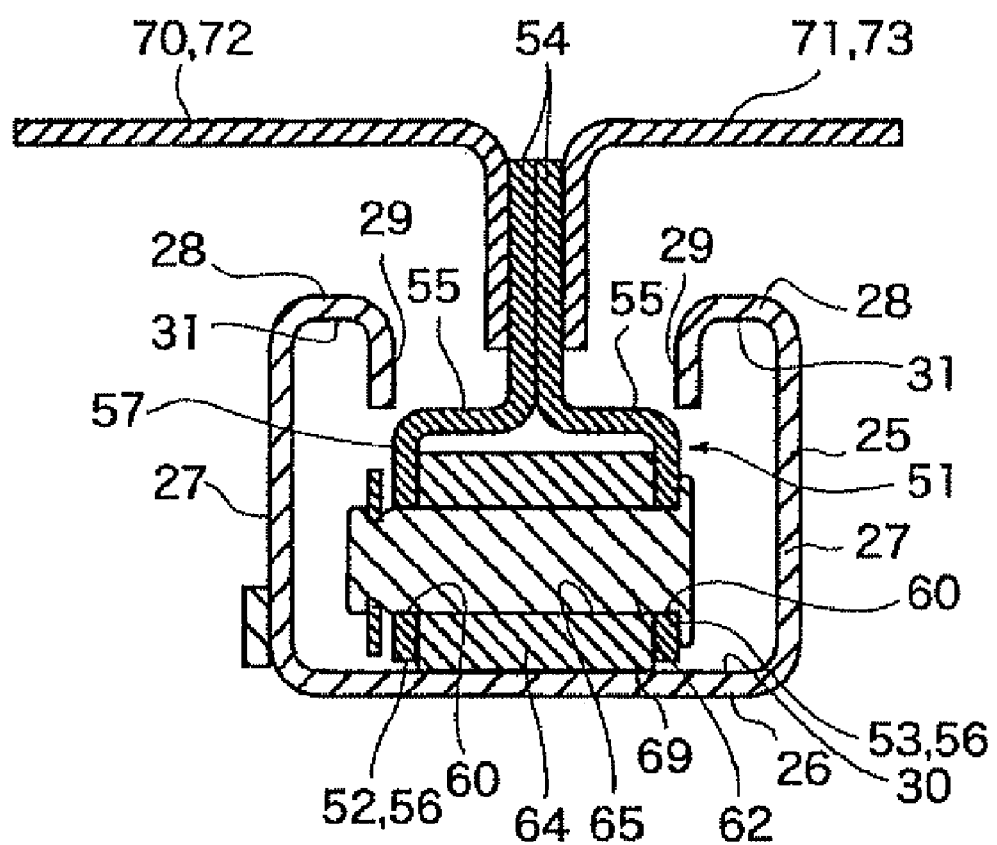
FIG. 7 is a cross sectional view taking along the arrow lines VII-VII in FIG. 6.
Figure 9:
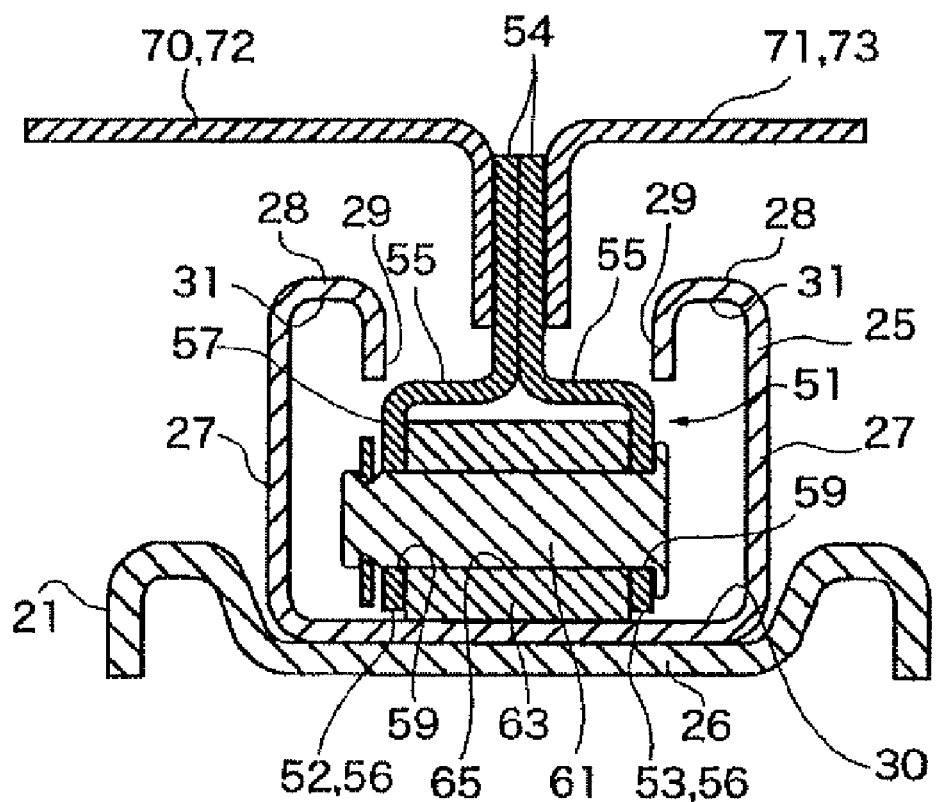
FIG. 9 is a cross sectional view taking along the arrow lines IX-IX in FIG. 6.

As shown in FIGS. 7 through 12, the slide unit 50 is provided with a pair of left and right roller support members 51 which are inserted into the insides of the left and right lower rails 25, respectively. Each roller support member 51 is composed of a inner-vehicle-side bracket 52 and a outer-vehicle-side bracket 53 (a pair of left and right brackets 52 and 53) which are shaped symmetrically and both extend in the forward/rearward direction and which are integrated by joining upwardly-projecting portions 54 of the inner-vehicle-side bracket 52 and the outer-vehicle-side bracket 53 together that extend vertically. The inner-vehicle-side bracket 52 and the outer-vehicle-side bracket 53 are each provided with a horizontal portion 55 which extends substantially in the horizontal direction from the lower end of the associated upwardly-projecting portion 54, and a side wall portion 56 which extends vertically downwards from an end of the horizontal portion 55. The horizontal portion 55 and the side wall portion 56 of each of the inner-vehicle-side bracket 52 and the outer-vehicle-side bracket 53 constitute a channel-shaped roller support portion 57 the lower surface of which is open. In addition, across sectional shape (lateral width) of the major part of the roller support portion 57 is just as shown in FIGS. 7 and 9; however, a portion of the channel-shaped roller support portion 57 in the vicinity of the front end thereof has a cross sectional shape narrower in width than the other part of the channel-shaped roller support portion 57 as shown in FIG. 8.

As shown in FIGS. 6, 7 and 9, support holes 59 are bored through the front ends of the inner-vehicle-side bracket 52 and the outer-vehicle-side bracket 53, and support holes 60 are bored through the rear ends of the inner-vehicle-side bracket 52 and the outer-vehicle-side bracket 53. A rotational shaft 61 and a rotational shaft 62, each of which is columnar in shape except both the left and right ends thereof, are engaged in the support holes 59 and the support holes 60 so as not to be rotatable while being prevented from coming out from the support holes 59 and the support holes 60, respectively. In addition, a lower roller 63 and a lower roller 64 having the same shape which are respectively coaxial with the support holes 59 and the support holes 60 are positioned inside the roller support portion 57 at positions corresponding to the support holes 59 and the support holes 60, respectively, and central through-holes 65 which pass through the lower roller 63 and the lower roller 64 are rotatably fitted on the rotational shaft 61 and the rotational shaft 62, respectively.

On the other hand, as shown in FIG. 8, support holes 66 are bored through portions of the inner-vehicle-side bracket 52 and the outer-vehicle-side bracket 53 in the vicinity of the front end of the roller support portion 57 (portions thereof which are narrower in width than the other portions), respectively. A rotational shaft 67 made of metal is fitted in the left and right support holes 66 so as to be non-rotatable while being prevented from coming out therefrom. The rotational shaft 67 is provided with a central shaft portion 67a which is shaped into a cylindrical column greater in diameter than the support holes 66 and positioned between the inner-vehicle-side bracket 52 and the outer-vehicle-side bracket 53, and is further provided with rotational support portions 67b which extend laterally from both the left and right ends of the central shaft portion 67a through the corresponding support holes 66 and which are smaller in diameter than the support holes 66. Collars 68, which are shorter than the rotational support portions 67b, are fitted on the periphery surfaces of the rotational support portions 67b so as to be unable to rotate relative to the rotational support portions 67b and the associated support holes 66. The collars 68 are made of metal having a greater strength than the rotational shaft 67. In addition, the central holes of a pair of left and right upper rollers 69 are rotatably fitted on portions of the left and right rotational support portions 67b in the vicinity of ends thereof, respectively, and the left and right upper rollers 69 are prevented from coming off the rotational support portions 67b by caulking the ends (caulking portions 67c) of the left and right rotational support portions 67b.

Figure 10:
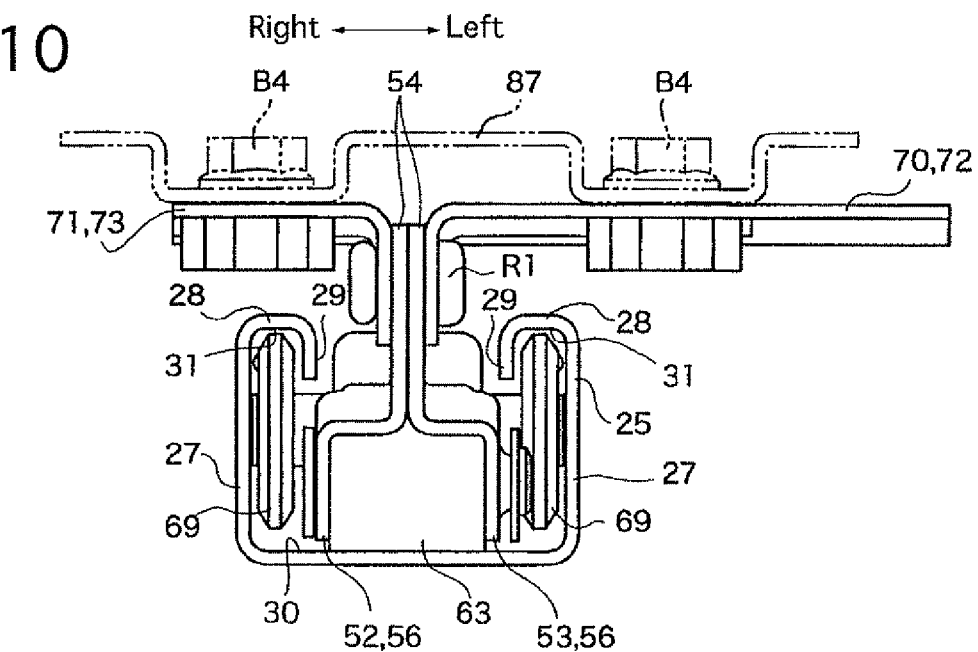
FIG. 10 is a front view viewed in the direction of the arrow X in FIG. 6.
Figure 11:
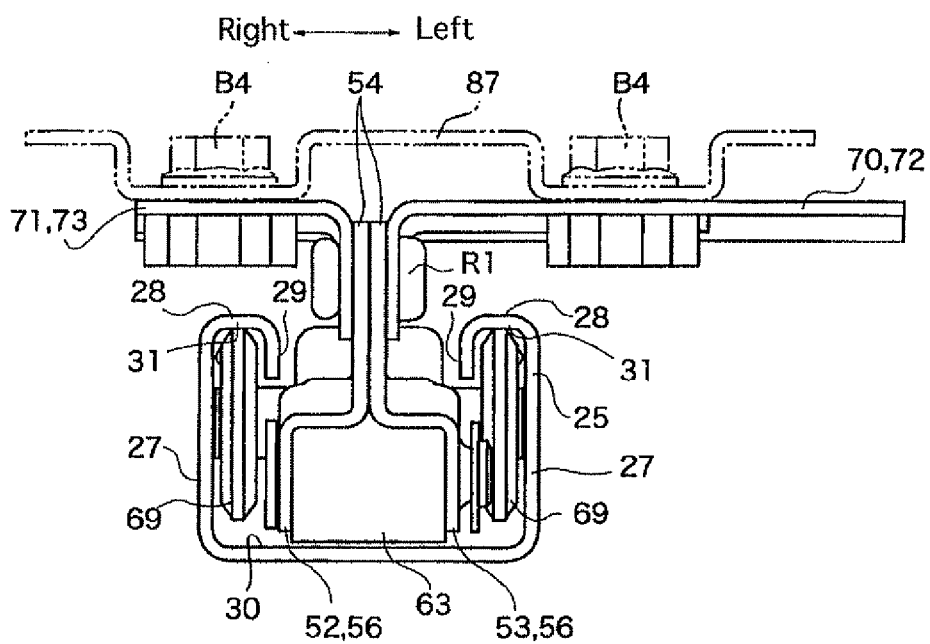
FIG. 11 is a cross sectional view similar to that of FIG. 10 at the time the front end of the luggage placement plate rises.

As shown in FIGS. 6, 10 and 11, the lower ends of the upper rollers 69 are positioned above a straight line connecting the lower ends of the lower rollers 63 and 64. Therefore, usually, the lower rollers 63 and 64 are in contact with the bottom surfaces 30 of the lower rails 25 while the left and right upper rollers 69 are spaced away from the bottom surfaces 30 (and the ceiling surfaces 31). Accordingly, the left and right roller support members 51 can slide in the forward/rearward direction relative to the left and right lower rails 25 by rotating the lower rollers 63 and the lower rollers 64. In addition, the limit of forward movement of the roller support members 51 is determined at a position where the front lower rollers 63 come in contact with the stopper members 32, and the limit of rearward movement of the roller support members 51 is determined at a position where the rear lower rollers 64 come in contact with the heads 43 (the stopper members 44).

As shown in FIGS. 7 through 12, a inner-vehicle-side bearing member 70 and a outer-vehicle-side bearing member 71, each of which has an L-shaped cross sectional shape, are integrated with the upwardly-projecting portions 54 of the inner-vehicle-side bracket 52 and the outer-vehicle-side bracket 53, respectively, by four rivets R1 arranged in the forward/rearward direction. The inner-vehicle-side bearing member 70 and the outer-vehicle-side bearing member 71 are provided with a bearing piece 72 and a bearing piece 73, respectively, which are positioned horizontally at the same level.

Figure 3:
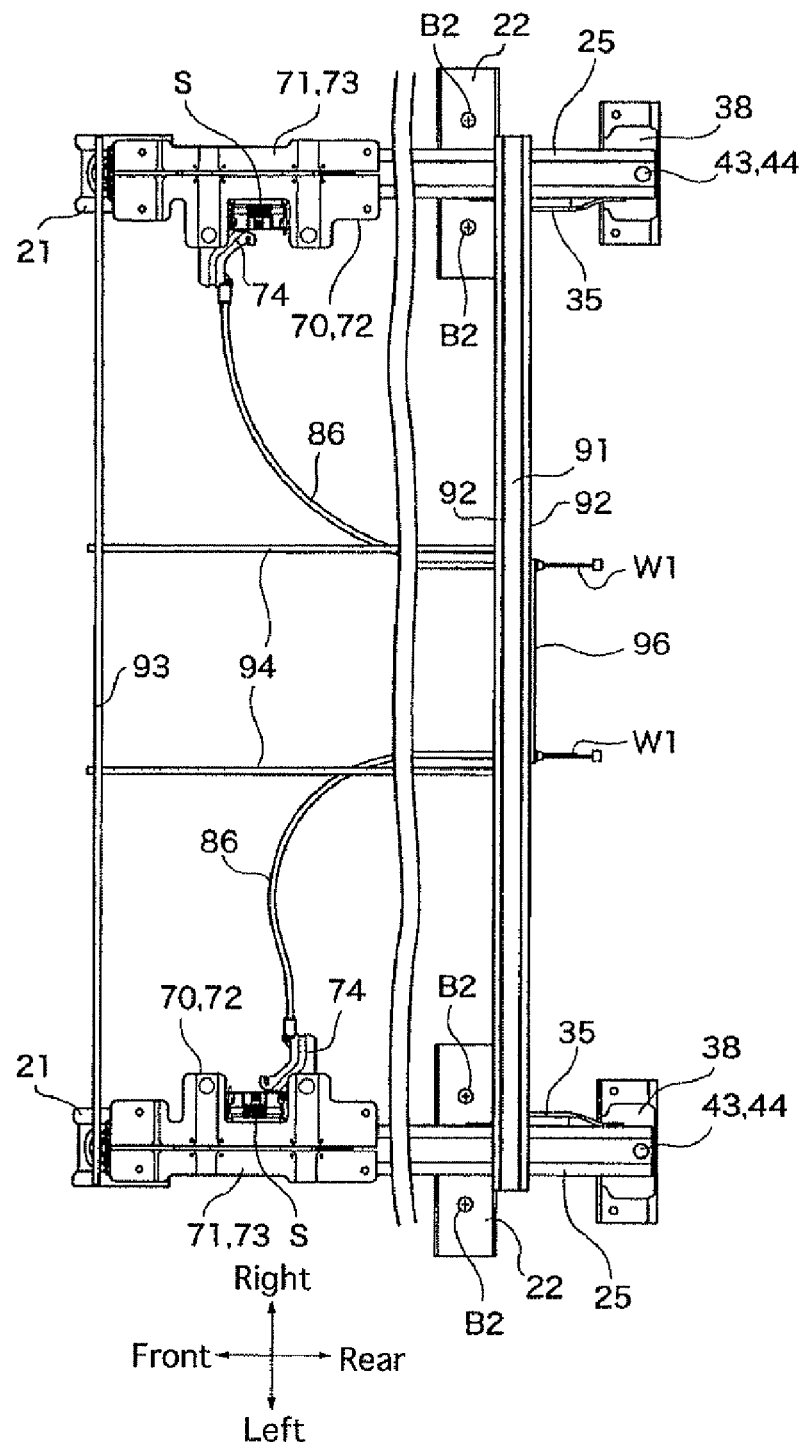
FIG. 3 is a plan view of the slide deck device with the luggage placement plate and side portion support members of the slide deck device removed.
Figure 12:
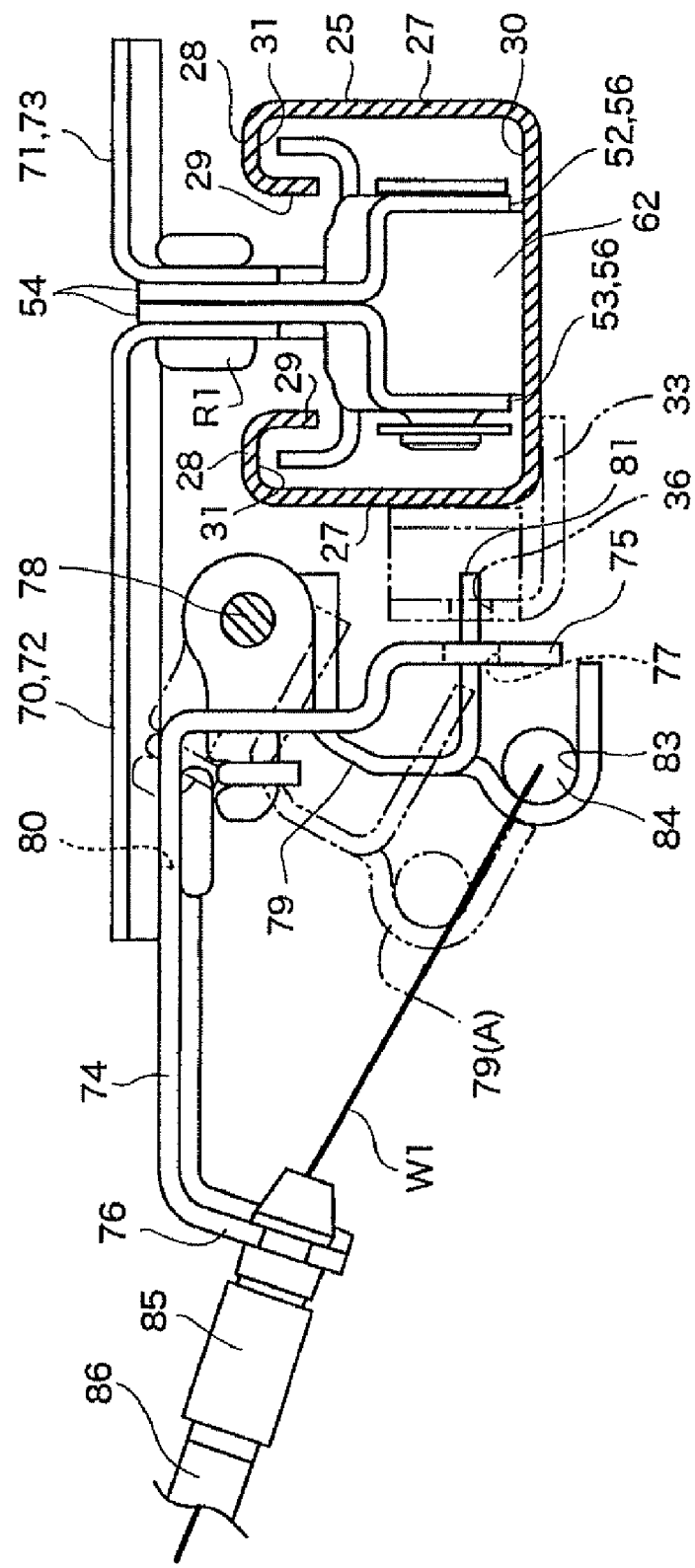
FIG. 12 is a cross sectional view taking along the arrow lines XII-XII in FIG. 6.

As shown in FIG. 12, a lock support member 74 is fixed to a lower surface of the bearing piece 72 of each of the left and right inner-vehicle-side bearing members 70. The lock support member 74 is provided with a downward-extending piece 75 which faces the side wall portion 27 of the associated lower rail 25 on the inner-vehicle-side, and an inclined piece 76 which serves as an end of the lock support member 74 on the opposite side from the downward-extending piece 75. A pair of front and rear through-holes 77 are bored through the downward-extending piece 75 to be positioned at the same level as the lock holes 36 of the locking members 33, 34 and 35 (the distance between the pair of through-holes 77 in the forward/rearward direction is identical to that between each pair of lock holes 36). In addition, both the front and rear ends of a rotational shaft 78 extending in the forward/rearward direction are supported by the downward-extending piece 75, and an upper end of a lock member 79 is rotatably supported by the rotational shaft 78. A inner-vehicle end of the lock member 79 projects toward the inner-vehicle side through a window hole 80 bored at an upper end corner of the lock support member 74 on the inner-vehicle side. In addition, the lock member 79 is provided on a middle portion thereof with a pair of front and rear lock lugs 81 which project toward the outer-vehicle side. The lock member 79 is rotatable between a locked position (position shown by solid lines in FIG. 12) in which the front and rear lock lugs 81 are respectively engaged in the front and rear through-holes 77 and the front and rear lock holes 36, and an unlocked position (position shown by imaginary lines A in FIG. 12) in which the front and rear lock lugs 81 are respectively disengaged from the front and rear through-holes 77 and the front and rear lock holes 36 toward the inner-vehicle side when the through-holes 77 face the lock holes 36 of any one of the locking members 33, 34 and 35, and the lock member 79 is biased to rotate toward the locked position at all times by the rotational biasing force of a torsion coil spring S (see FIG. 3) wound around the rotational shaft 78.

In addition, an end (lower end) of the lock member 79 is bent toward the outer-vehicle side so that a recessed engaging portion 83 is formed on an outer-vehicle side of the lower end. An engaging ball 84 is engaged in the recessed engaging portion 83, and an operational wire W1, one end of which is connected to the engaging ball 84, extends toward the inner-vehicle side of the lock member 79 through a through-hole (not shown) bored through the lock member 79. The operational wire W1 is inserted into a support cylinder 85 supported by the inclined piece 76 and a flexible outer tube 86 fixed at one end thereof to the support cylinder 85, and the other end of the operational wire W1 is connected to an operational handle 100 which will be discussed below.

Figure 5:
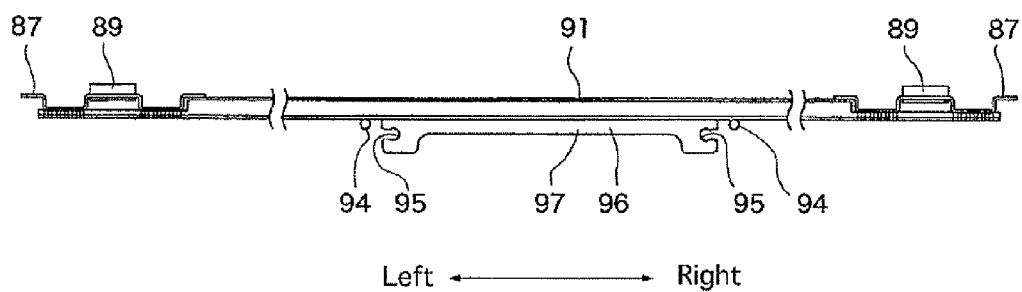
FIG. 5 is a rear view of the slide unit.
Figure 17:
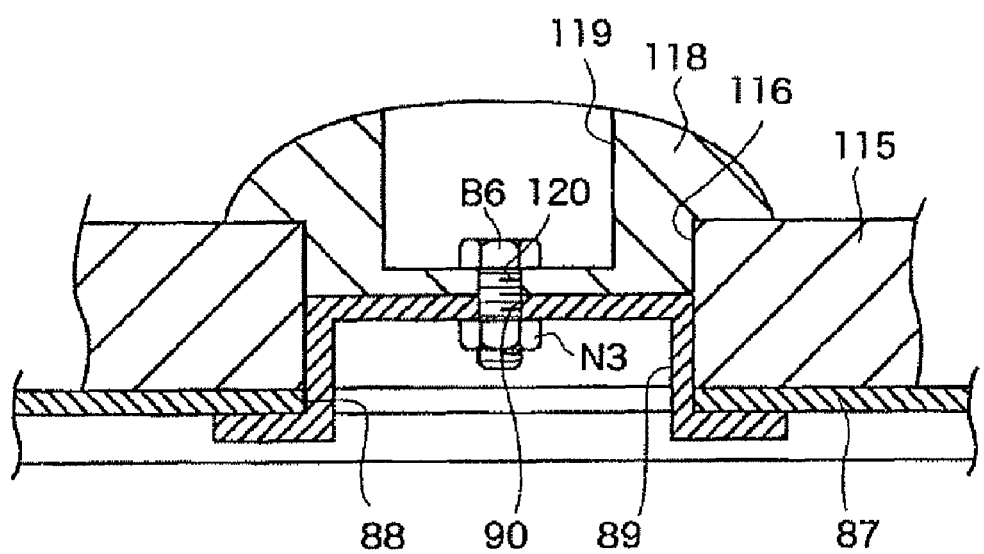
FIG. 17 is a cross sectional view taking along the arrow lines XVII-XVII in FIG. 2.

Side portion support members 87 made of metal which extend in the forward/rearward direction are each mounted on the top surfaces of the left and right bearing pieces 72 of the inner-vehicle-side bearing member 70 and the left and right bearing pieces 73 of the outer-vehicle-side bearing member 71, and a portion of each side portion support member 87 in the vicinity of the front end thereof and the bearing pieces 72 and 73 are fixed to each other by four bolts B4. The left and right side portion support members 87 are substantially identical in forward/rearward dimensions to those of the lower rails 25, and each side portion support member 87 has a substantially W-shaped cross section as shown in FIG. 5. As shown in FIG. 17, three mounting holes 88 are bored through the side portion support member 87 to be aligned in the forward/rearward direction. A fixing bracket 89 having a substantially U-shaped cross section is fitted into each mounting hole 88 from below and fixed thereto by spot-welding both the front and rear ends of the fixing bracket 89 to a lower surface of the side portion support members 87. A through-hole 90 is bored through on an upper portion of each fixing bracket 89, and a nut N3 is fixed to a lower surface of the upper portion of each fixing bracket 89 to be coaxial with the through-hole 90 thereof.

A pair of front and rear upper flanges 92 of a metal rear beam member 91, which is shaped into a channel extending in the leftward/rightward direction and the upper surface of which is open, are welded to portions of the lower surfaces of the left and right side portion support members 87 in the vicinity of the rear ends thereof, and both ends of a metal front beam member 93 which extends in the leftward/rightward direction are welded to portions of the lower surfaces of the left and right side portion support members 87 in the vicinity of the front ends thereof. In addition, both ends of a pair of left and right metal connecting members 94 extending in the forward/rearward direction are welded to two portions on the lower surface of the rear beam member 91 in the vicinity of the center thereof and two portions on the lower surface of the front beam member 93 in the vicinity of the center thereof. Portions of the left and right outer tubes 86 in the vicinity of central portions thereof are fixed to middle portions of the left and right metal connecting members 94 by fixing devices not shown in the drawings, respectively.

Figure 2:
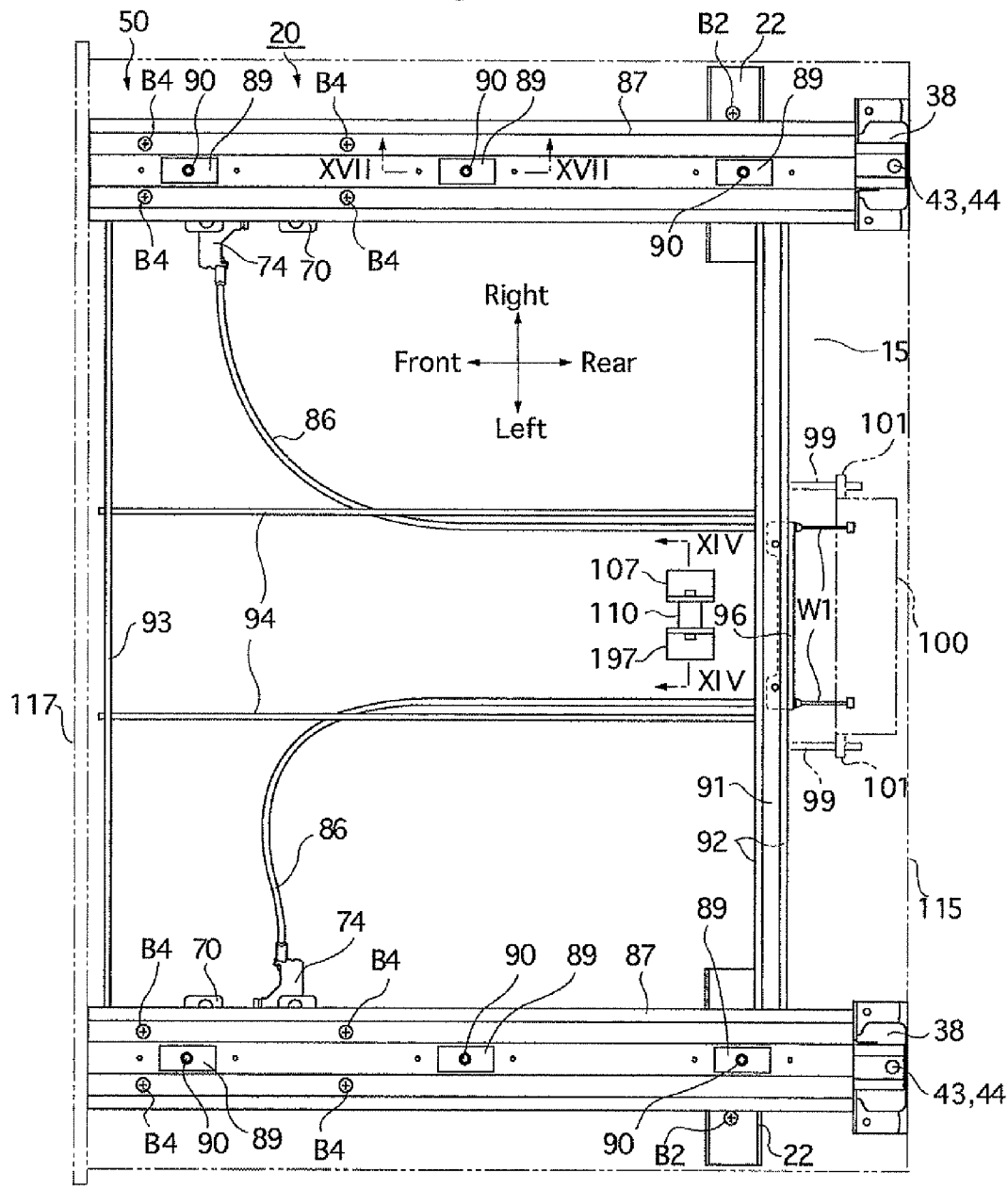
FIG. 2 is a plan view of the slide deck device, showing a luggage placement plate thereof by imaginary lines.
Figure 4:
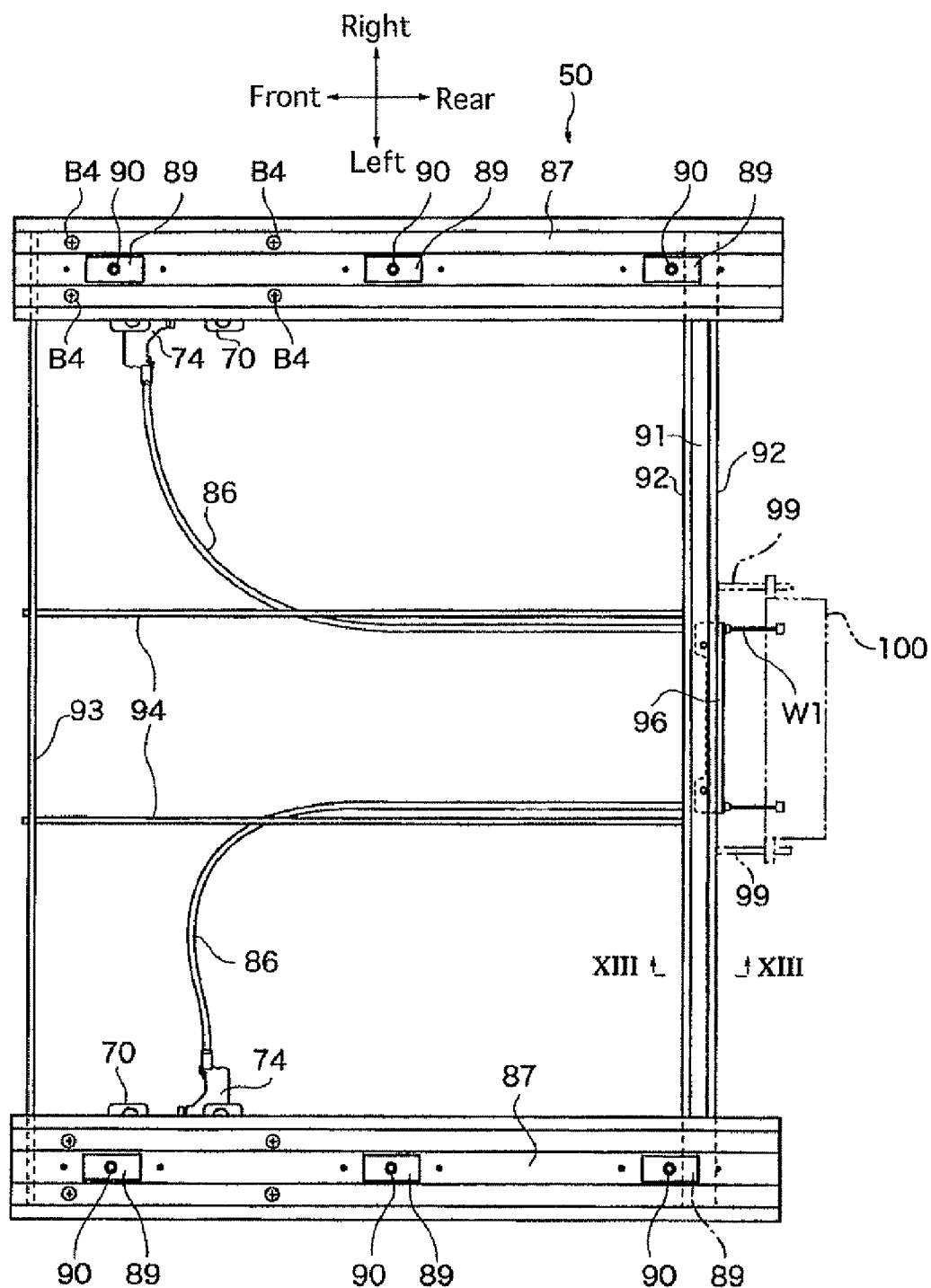
FIG. 4 is a plan view of a slide unit.
Figure 13:
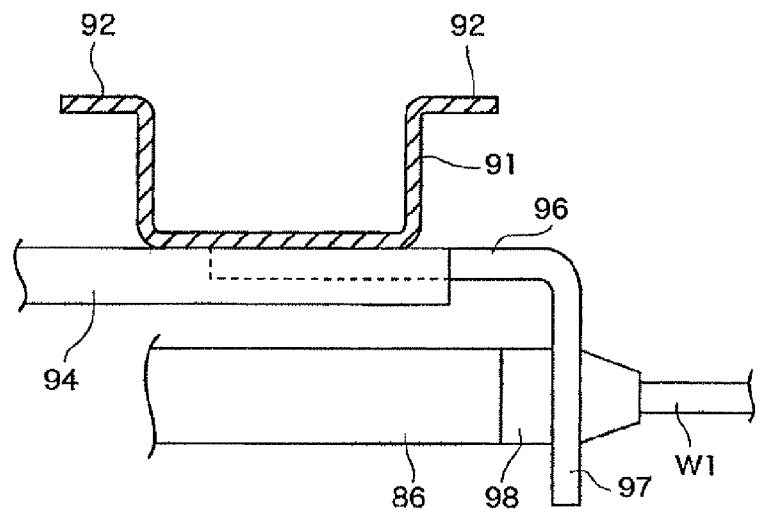
FIG. 13 is a cross sectional view taking along the arrow lines XIII-XIII in FIG. 4.

As shown in FIGS. 2, 4 and 13, a tube bracket 96 which is shorter than the rear beam member 91 and has an L-shaped cross sectional shape is fixed to the lower surface of a central portion of the rear beam member 91. Support cylinders 98 made of metal are fixed as a pair of left and right cylinders to mounting recesses 95 (see FIG. 5) formed on a downward-extending piece 97 of the tube bracket 96, and the other ends (rear ends) of the outer tubes 86 are connected to the left and right support cylinders 98, respectively. As shown in FIGS. 2 and 4, two handle brackets 99 project rearward from portions of the rear surface of the rear beam member 91 in the vicinity of a central portion thereof, and rotational shafts 101 projecting from both the left and right ends of the operational handle 100 are rotatably fitted in through-holes (not shown) bored through the left and right handle brackets 99, respectively.

The operational handle 100 is rotatable between the locked position and the unlocked position; in addition, the rear ends of the operational wires W1 which project rearward from the left and right support cylinders 98 are fixed to the lower surface of the operational handle 100. Since the biasing forces of the torsion coil springs S that bias the lock members 79 to rotate the same are exerted on the operational wires W1, the operational handle 100 is usually positioned in the locked position. On the other hand, if the operator manually operates the operational handle 100 toward the unlocked position, the operational wires W1 are pulled rearward, which causes the engaging balls 84, to which the front ends of the operations wires W1 are connected, to rotate the lock members 79 to rotate toward the unlocked positions thereof, thus releasing the lock between the lock lugs 81 (the lock members 79) and the lock holes 36.

The above described members slidable in the forward/rearward direction relative to the left and right lower rails 25, i.e., each of the members designated by the reference numerals 51 through 101 is an element of the slid unit 50. In addition, the inner-vehicle-side brackets 52, the outer-vehicle-side brackets 53, the inner-vehicle-side bearing members 70, the outer-vehicle-side bearing members 71 and the side portion support members 87 are elements of the upper rails.

Figure 14:
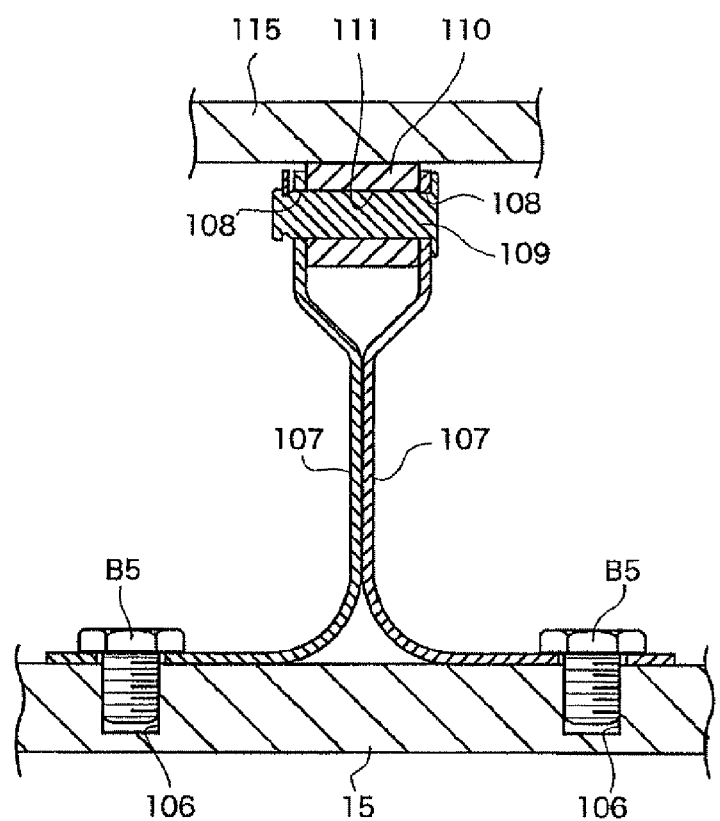
FIG. 14 is a cross sectional view taking along the arrow lines XIV-XIV in FIG. 2.
Figure 15:
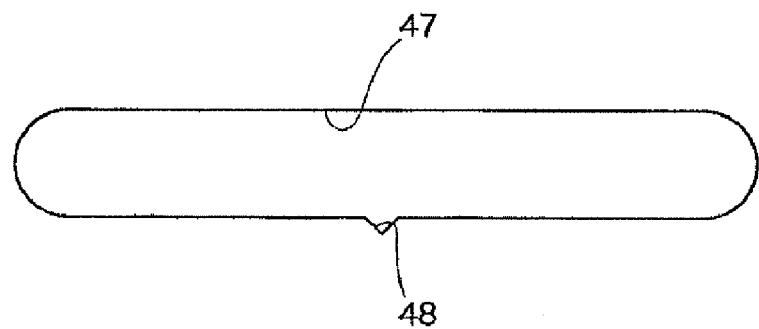
FIG. 15 is an enlarged view of an elongated hole and a notch.

As shown in FIG. 14, a pair of left and right screw holes 106 are bored into a central portion of the bottom plate 15, with respect to the leftward/rightward direction in the vicinity of the rear end of the bottom plate 15. A pair of left and right support plates 107, each having a substantially L-shaped cross section are mounted on the top surface of the bottom plate 15, and the left and right support plate 107 is fixed to the top surface of the bottom plate 15 by screwing bolts B5 which pass through the left and right support plates 107 into the left and right screw holes 106, respectively. Support holes 108 coaxial with each other are bored through the upper ends of the left and right support plates 107, and a rotational shaft 109 is fitted in the left and right support holes 108 to be non-rotatable while being prevented from coming out therefrom. The rotational shaft 109 is columnar in shape except for both the left and right ends thereof, and on this column-shaped portion a central through-hole 111 of a support roller 110 having a cylindrical shape is rotatably fitted.

In addition, the luggage placement plate 115, which is rectangular in a plan view and fully covers the top surface of the slide unit 50, is mounted on the upper surfaces of the three fixing brackets 89 of each of the left and right side portion support members 87. As shown in FIG. 17, engaging holes 116 each having a rectangular shape in a plan view are bored through the luggage placement plate 115 at positions corresponding to the fixing brackets 89, respectively. The fixing brackets 89 are fitted into lower portions of the engaging holes 116 from below, respectively, so that upper surfaces of the left and right side portion support members 87 support the left and right side portions of the lower surfaces of the luggage placement plate 115, respectively. A lower portion of a rubber cap member 118 is fitted into an upper portion of each engaging hole 116, while the lower surface of the peripheral portion of each cam member 118 is in contact with an upper surface of the luggage placement plate 115. A through-hole 120 is formed through the bottom of each recessed portion 119 formed on top of each cam member 118, and the luggage placement plate 115 is fixed to the left and right side portion support members 87 by screwing bolts B6, which are inserted through the through-holes 120 and the through-holes 90 of the fixing brackets 89, into the nuts N3 that are fixed to the lower surfaces of the fixing brackets 89, respectively.

In addition, as shown in FIG. 2, a front plate 117 made of aluminum which is laterally-elongated rectangular in a front view is fixed to the front of the luggage placement plate 115.

Accordingly, upon the luggage placement plate 115 being fixed to the upper surfaces of the fixing brackets 89, a central portion of the lower surface of the luggage placement plate 115 in the leftward/rightward direction is supported by the support roller 110 as shown in FIG. 14.

Operations of the slide deck device 20 that has the above described structure will be discussed hereinafter.

When the rear opening 11 of the vehicle 10 is closed by the back door 12, the luggage placement plate 115 and the slide unit 50 of the slide deck device 20 are positioned in an accommodation position (position shown in FIG. 2) in which the front plate 117 is positioned at substantially the same position as the front brackets 21 in the forward/rearward direction, and the lock lugs 81 of the left and right lock members 79 are engaged in the lock holes 36 of the left and right locking members 33 (to lock the locking members 33).

Rotating the operational handle 100 to the unlocked position with the back door 12 open causes the operational wire W1 to be pulled, thus causing each of the left and right lock members 79 to rotate to the unlocked position, which consequently releases the locked state by the engagement between the lock members 79 (the lock lugs 81) and the lock holes 36 of the locking members 33). Therefore, drawing the luggage placement plate 115 rearward with the operational handle 100 remaining manually held causes the luggage 115 and the slide unit 50 to slide rearward while rotating the lower rollers 63, the lower rollers 64 and the support roller 110, thus causing the rear of the luggage placement plate 115 to project toward the rear of the vehicle 10 (the rear opening 11). Due to the structure in which the locking members 33, 34 and 35 are fixed to each of the left and right lower rails 25 at three points thereon in the forward/rearward direction, if the left and right lock members 79 (the lock lugs 81) are engaged in the lock holes 36 of the locking members 34 by releasing the operational handle 100 from hand upon the left and right lock members 79 reaching the same position as the lock members 34, the luggage placement plate 115 and the slide unit 50 can be held at that position. In addition, as shown by imaginary lines in FIG. 6, if the operational handle 100 is released upon sliding the luggage placement plate 115 to the maximum draw-out position thereof at which the rear of the luggage placement plate 115 largely projects rearward from the rear opening 11 of the vehicle 10 and also at which the left and right lower rollers 64 are positioned immediately in front of the left and right heads 43 (the stopper members 44), the left and right lock members 79 (the lock lugs 81) are engaged in the lock holes 36 of the locking members 35, so that the luggage placement plate 115 and the slide unit 50 can be held at the maximum draw-out position.

In this manner, the luggage placement plate 115 can be made to slide between the accommodation position and the maximum draw-out position in this manner. However, for instance, if the rear of the luggage placement plate 115 is made to project largely rearward from the rear opening 11 with heavy luggage being placed on the rear end of the luggage placement plate 115, the rear end of the luggage placement plate 115 flexes downward while the front lower rollers 63 and the front of the luggage placement plate 115 are lifted upward with contact points between the rear lower rollers 64 and the bottom surfaces 30 of the lower rails 25 serving as fulcrums. However, if the front lower rollers 63 and the front of the luggage placement plate 115 are lifted upward in this manner, the upper rollers 69 which are positioned in front of the rear lower rollers 64 come in contact with the ceiling surfaces 31 of the lower rails 25 as shown in FIG. 11, which makes it possible to slide the luggage placement plate 115 and the slide unit 50 forward or rearward through the use of the rear lower rollers 64 and the left and right upper rollers 69.

When the front of the luggage placement plate 115 rises in this manner, the front lower rollers 63 are not worn away or become deformed excessively even if the luggage placement plate 115 and the slide unit 50 are made to slide in such a state because the front lower rollers 63 are spaced away from (not in contact with) the bottom surfaces 30 and the ceiling surfaces 31 of the lower rails 25. Accordingly, when the lower rollers 63 and the lower rollers 64 are thereafter again brought into contact with the bottom surfaces 30 of the lower rails 25, the slide unit 50 and the luggage placement plate 115 can be made to slide smoothly.

On the other hand, similar effects can be obtained also in the case where heavy luggage is placed on the front end of the luggage placement plate 115.

Namely, if heavy luggage is placed on the front end of the luggage placement plate 115, the rear lower rollers 64 and the rear of the luggage placement plate 115 are lifted upward with contact points between the front lower rollers 63 and the bottom surfaces 30 of the lower rails 25 serving as fulcrums. However, if the rear lower rollers 64 and the rear of the luggage placement plate 115 are lifted upward in this manner, the upper rollers 69 which are positioned behind the front lower rollers 63 come in contact with the ceiling surfaces 31, which makes it possible to slide the luggage placement plate 115 and the slide unit 50 forward or rearward through the use of the front lower rollers 63 and the left and right upper rollers 69.

In addition, if heavy luggage is placed on the front end of the luggage placement plate 115 in this manner, at this time the rear lower rollers 64 are spaced upwardly away from the bottom surfaces 30 of the lower rails 25. However, the rear lower rollers 64 are not worn away excessively or become largely deformed even if the luggage placement plate 115 and the slide unit 50 are made to slide in such a state because the rear lower rollers 64 are spaced away from (not in contact with) the bottom surfaces 30 and the ceiling surfaces 31 of the lower rails 25. Accordingly, when the lower rollers 63 and the lower rollers 64 are thereafter again brought into contact with the bottom surfaces 30 of the lower rails 25, the slide unit 50 and the luggage placement plate 115 can be made to slide smoothly.

In the above illustrated embodiment, the lower rollers 63 are arranged in front of the upper rollers 69 while the lower rollers 64 are arranged in the rear of the upper rollers 69 so that the slide deck device can deliver certain effects even in the case where heavy luggage is placed on either the front end or the rear end of the luggage placement plate 115. However, if the slide deck device only needs to deliver such certain effects only when heavy luggage is placed on the rear end of the luggage placement plate 115, no lower rollers need to be arranged in front of the upper rollers 69, and a plurality of lower rollers only need to be arranged in the rear of the upper rollers 69 at different positions in the forward/rearward direction.

The number of the lower rollers that are disposed in front or to the rear of each upper roller 69 does not have to be one; a plurality of lower rollers can be arranged in front or to the rear of each upper roller 69 at different positions in the forward/rearward direction.

INDUSTRIAL APPLICABILITY

The present invention is applicable to a bottom plate of a luggage compartment of a vehicle having a back door. With this application, a luggage placement plate can be operated to slide smoothly even if heavy luggage is placed on the front or rear end of the luggage placement plate; moreover, no adverse effect occurs in the subsequent sliding operation.

The invention claimed is:

1. A slide deck device for a vehicle, said slide deck device comprising:
   a pair of left and right lower rails, each having a channel shape which is fixed to a floor of a luggage compartment of the vehicle, having a back door, and wherein said pair of left and right lower rails extend in a forward/rearward direction wherein upper surfaces thereof are open;
   a pair of left and right upper rails which are slidable relative to said pair of left and right lower rails and support left and right ends of a lower surface of a luggage placement plate, respectively;
   a plurality of lower rollers which are arranged in said forward/rearward direction, are mounted to said upper rails, are positioned in said lower rails, and contact bottom surfaces of said lower rails to be rotatable thereon; and
   upper rollers which are mounted to said upper rails to be positioned in front of rearmost lower rollers of said lower rollers, are positioned in said lower rails, are spaced away from ceiling surfaces of said lower rails and are spaced away from said bottom surfaces of said lower rails when all of said lower rollers come in contact with said bottom surfaces, and come in contact with said ceiling surfaces to be rotatable thereon when some of said lower rollers move away from said bottom surfaces and are away from said ceiling surfaces.

2. The slide deck device for a vehicle according to claim 1, wherein at least one of said lower rollers is disposed in front of said upper rollers and at least one of said lower rollers is disposed behind said upper rollers.

\* \* \* \* \*